United States Patent
Aschern et al.

(10) Patent No.: US 9,751,805 B2
(45) Date of Patent: Sep. 5, 2017

(54) METHOD FOR STABILIZING BETA-HEMIHYDRATE PLASTER

(71) Applicant: SINIAT INTERNATIONAL SAS, Avignon (FR)

(72) Inventors: Winfried Aschern, Volkach (DE); Jörg Bold, Kaiserslautern (DE)

(73) Assignee: ETEX BUILDING PERFORMANCE SAS, Avignon (FR)

( * ) Notice: Subject to any disclaimer, the term of this patent is extended or adjusted under 35 U.S.C. 154(b) by 165 days.

(21) Appl. No.: 14/405,155

(22) PCT Filed: Jun. 5, 2013

(86) PCT No.: PCT/EP2013/061553
§ 371 (c)(1),
(2) Date: Dec. 3, 2014

(87) PCT Pub. No.: WO2013/182587
PCT Pub. Date: Dec. 12, 2013

(65) Prior Publication Data
US 2015/0152010 A1    Jun. 4, 2015

(30) Foreign Application Priority Data
Jun. 6, 2012    (EP) .................................... 12171114

(51) Int. Cl.
C04B 28/14    (2006.01)
C04B 11/00    (2006.01)
C04B 111/00   (2006.01)

(52) U.S. Cl.
CPC .......... *C04B 28/147* (2013.01); *C04B 11/007* (2013.01); *C04B 2111/0062* (2013.01)

(58) Field of Classification Search
CPC ...................................................... C04B 28/14
See application file for complete search history.

(56) References Cited

U.S. PATENT DOCUMENTS

| | | |
|---|---|---|
| 1,713,879 A | 5/1929 | McAnally |
| 3,415,910 A | 12/1968 | Kinkade et al. |
| 3,723,146 A | 3/1973 | Lane |

(Continued)

FOREIGN PATENT DOCUMENTS

| | | |
|---|---|---|
| EP | 1 547 984 A1 | 6/2005 |
| EP | 2 025 652 A2 | 2/2009 |

(Continued)

OTHER PUBLICATIONS

Ellis M. Gartner et al.; "Cohesion and expansion in polycrystalline solids formed by hydration reactions—The case of gypsum plasters"; Cement and Concrete Research; Pergamon Press; Elmsford, NY, US; vol. 39, No. 4; Apr. 1, 2009; pp. 289-295; XP026027850.

(Continued)

*Primary Examiner* — Paul Marcantoni
(74) *Attorney, Agent, or Firm* — Kenealy Vaidya LLP

(57) ABSTRACT

The instant invention is concerned with the post-treatment of β-hemihydrate plasters for the purpose of stabilization. The invention relies in the addition of a retardant to the calcined β-hemihydrate. It is also the purpose of the invention to provide stabilized β-hemihydrate plasters which exhibit advantageous properties.

23 Claims, 2 Drawing Sheets

(56) References Cited

U.S. PATENT DOCUMENTS

| | | |
|---|---|---|
| 4,360,386 A | 11/1982 | Bounini |
| 2005/0152827 A1* | 7/2005 | Bold .................... B01F 9/0007 423/554 |
| 2008/0135072 A1 | 6/2008 | Bold |
| 2008/0148998 A1 | 6/2008 | Bruce et al. |
| 2011/0056409 A1* | 3/2011 | Winkler ............. C04B 40/0039 106/651 |

FOREIGN PATENT DOCUMENTS

| | | |
|---|---|---|
| GB | 1 233 436 A | 5/1971 |
| WO | 2008/115929 A1 | 9/2008 |

OTHER PUBLICATIONS

L. Amathieu & R. Boistelle; "Improvement of the Mechanical Properties of Set Plasters by Means of Four Organic Additives Inducing {101} Faces"; Journal of Crystal Growth; vol. 79; Dec. 2, 1986; pp. 169-177; XP002686369.

Hill Jorg-Rudiger et al., "Retardation of Setting of Plaster of Paris by Organic Acids: Understanding the Mechanism through Molecular Modeling"; Journal of Computational Chemistry, John Wiley and Sons; Chichester, GB; vol. 25, No. 12; Sep. 1, 2004; pp. 1438-1448; XP002493160.

International Search Report for PCT/EP2013/061553 dated Sep. 20, 2013.

\* cited by examiner

METHOD FOR STABILIZING BETA-HEMIHYDRATE PLASTER

This application is a national phase filing under 35 C.F.R. §371 of and claims priority to PCT Patent Application No. PCT/EP2013/061553, filed on Jun. 5, 2013, which claims the priority benefit under 35 U.S.C. §119 of European Patent Application No. 12171114.7, filed on Jun. 6, 2012, which are hereby incorporated in their entireties by reference.

FIELD OF THE INVENTION

The instant invention is concerned with the post-treatment of β-hemihydrate plasters for the purpose of stabilization. It is also the purpose of the invention to provide stabilized β-hemihydrate plasters which exhibit advantageous properties.

TECHNICAL BACKGROUND

Plaster, as a terminology generally accepted in the art, corresponds to partially dehydrated gypsum as a result of a calcination process performed under dry conditions. Gypsum ($CaSO_4.2\ H_2O$), a calcium-sulphate dihydrate (DH) is thermally treated to remove part of the combined water and turn into metastable hemihydrate (HH; ($CaSO_4.1/2\ H_2O$)) and dehydrated anhydrite (AIII or AII; ($CaSO_4\ \epsilon.H_2O$)) forms. Whether HH, AIII and AII is formed depends on the extent of the calcination temperature and conditions, e.g. vapour pressure.

While the gypsum becomes dehydrated, two mains types of hemihydrate are produced. The most commonly produced calcium sulphate hemihydrate is the "β-HH", which results from the calcination of ground gypsum under normal atmospheric conditions. The other common type is called "α-HH" and results from the calcination of gypsum under hydrothermal conditions.

One of the major differences between the α- and β-forms of hemihydrate is the amount of water required to be admixed to give a pourable slurry (water demand), which is much higher for the β-hemihydrate than for the alpha hemihydrate. This is related to the different physical structures of the two forms in terms of porosity and crystallinity.

It is well known that HH-plasters harden to a solid matter if gauged with water, the reason being a substantial difference in the solubility between HH and DH. The phenomenon is called setting during which the recrystallisation starts and progresses after an initial germination period.

Due to its ability to build up new crystalline structure out of aqueous slurry, plasters are useful as a binder in the production of pre-fabricated gypsum elements such as plasterboards, gypsum fibre board and gypsum blocks. Generally, the β plasters are best suited for light weight fast setting products whereas the alpha plasters may find uses in for higher strength elements of construction.

In most cases, extra water (the water demand) is needed to achieve free flowable slurry which can be handled in the manufacture of the gypsum elements. However, the additional water must necessarily be removed in a final drying step which is very energy intensive and expensive. It must thus be reduced as much as possible.

The rheological properties of aqueous hemihydrates are dependent on the surface chemistry and the particle size and shape of the hemihydrate particles after mixing with water. This is particularly true when β-hemihydrate is involved, since the water demand is higher for this type of plaster.

Up until then, the calcined plasters were subjected to a forced ageing step in order to stabilize the crystalline structure and reduce the final water demand without impairing the mechanical properties of the product. Indeed, due to the rough thermal treatment the physical microstructure of β-HH is stressed and quite unstable. Thus one observes that, in contact with liquid water, a β-hemihydrate will partially disintegrate into very small particles. When absorbing humidity, the stress is lowered and the disintegration phenomenon fades. This treatment of the calcined β-HH is called "ageing". This term does not however refer to "aridisation" which is essentially calcining in the presence of deliquescent substances.

The conventional stabilization processes as reported in EP 1 547 984 usually consist in a) providing a heated HH plaster at temperatures over 100° C., b) feeding the hot plaster in a moistening device, c) injecting water and/or steam, d) maintaining the atmosphere of the moistening conditions in order to cure the product at high temperatures f) feeding the moistened and cured blend into a drying device g) drying said moistened and cured blend and optionally h) grinding the dried product.

It is generally admitted that re-adsorption of water is the main promoter of ageing and several processes of the prior art such as reported in U.S. Pat. No. 1,713,879 involve the addition of water and/or steam to the calcined plaster.

In U.S. Pat. No. 3,415,910 the ageing process consists in quenching hot calcined hemihydrates with water whilst maintaining a temperature high enough to avoid the formation of dihydrate gypsum (DH) and performing a subsequent heating above 102° C. In GB 1233436, the treatment temperature could be as low as room temperature.

The European patent application EP 2 025 652 discloses a process for the preparation of stabilized anhydrite III to prevent its transformation into one of the hemihydrated forms. The envisaged solution consists in drying particles of natural hemihydrate at a temperature between 100 and 700° C. to provide anhydrite III in which additives such as water, diluted lime hydroxide, diluted cement, fluidizers or retardants are added by vaporization.

The PCT application WO 2008/115929 contemplates the addition of crystal modifiers at different steps of the calcination process to control the set of time of alpha hemihydrate plasters.

As regards the known ageing treatments of β-hemihydrates, ageing process is known from the patent application US 2008/0148998 which reports the post treatment of calcined β-hemihydrate using steam at a pressure above atmospheric pressure.

The patent application U.S. Pat. No. 4,360,386 disclosed the addition of a gypsum solubilizing agent into the aqueous wetting solution to shorten the time required for the ageing process.

Given the difficulties to improve efficiently the operating conditions, US 2008/0135072 and EP 1 547 984 show that the efforts of development were focused on the improvement of the apparatus implementing the stabilization process.

Nevertheless, in all the existing methods, the aged plaster still has the main drawback of developing strength on setting and unpredictable setting properties shortly after its treatment. Therefore, these plasters need to be dried if they are no used immediately which increases the difficulty of controlling the process, storage conditions, limits the production capability of the plant and requires additional equipment to dry the remaining plaster. In addition, the manufacturing facilities are most often limited in terms of capacities of production by the size and capacity of the dryers.

Therefore, there is a long felt need to provide an improved process which allows stabilizing the β-hemihydrate plasters durably.

SUMMARY OF THE INVENTION

A first aspect of the invention is directed to a process for the stabilization of a β-hemihydrate plaster hence to a process for the manufacture of stabilized β-hemihydrate plaster powder comprising the moistening of calcined β-Hemihydrate with the addition of a retardant.

According to embodiments, the process may comprise the steps of providing calcined β-hemihydrate plaster moistening of said calcined β-Hemihydrate by the addition of water and a retardant to provide stabilized β-hemihydrate plaster powder, the amount of moistening water is comprised between 1 and 6% by weight based on the weight of the fed β-hemihydrate plaster.

According to some embodiments, the retardant may be added together with the moistening water.

According to some embodiments, the amount of water involved in the moistening may be such that the amount of residual water in the stabilized β-hemihydrate plaster is less than 3.5%, preferably less than 2.6%, more preferably less than 2.2%, most preferably less than 1.8% by weight pursuant to standard ASTM C471 M.

According to some embodiment, the amount of water may be comprised between 1 and 6% by weight, preferably 3 to 5% by weight based on the weight of the fed β-hemihydrate plaster.

According to some embodiments, the amount of retardant may be from 0.001 to 0.1%, preferably from 0.005 to 0.1%, more preferably from 0.01 and 0.03% by weight based on the weight of the fed β-hemihydrate plaster.

According to some embodiments, the retardant may be selected among nucleation retardants; hydrolysed or degraded proteins such as hydrolysed amino acid type, polycondensated amino acid, such as keratin, Retardan P, Retardan L, Plastretard PE, Plastretard P200, Plastretard L200; phosphonic acids and salts thereof such as phosphonic nitrilotrimethylen, hydroxyethyliden 1-1 biphosphonic acid, polyphosphoric acid; phosphates and salts thereof such as sodium tripolyphosphate; carboxylic acids in basic pH such as tartaric acid, malic acid, tricarbellic acid; polyelectrolytes of the carboxylic or the polyphosphonic types such as polyacrylic acids having a molecular weight of less than 5000, and mixtures thereof.

According to some embodiments, the retardant may be of the hydrolysed amino acid type and is preferably Retardan P (polycondensated amino acid (Ca-salt), Retardan L (polycondensated amino acid (Ca-salt), liquid solution), Plastretard (degraded mixture of polyamids, salified with calcium), Retardan 200 (modified amino acid) or mixture thereof.

According to some embodiment, the β-hemihydrate plaster fed into the process may have a temperature comprised between 10° C. and 99° C., preferably between 25 and 80° C., most preferably between 25 and 60° C.

According to some embodiments, the process may be carried out at atmospheric pressure.

According to some embodiment, the stabilized β-hemihydrate plaster powder may be further subjected to a drying and/or grinding step and optionally stored for at least several days before being subjected to a drying and/or grinding step.

According to some embodiment, the drying step may be performed at a temperature within the range of 75 and 130° C., preferably below 115° C. and most preferably below 105° C.

The use of a process according to the first aspect of the present invention, provides the provision of, hence manufacture of stabilized β-hemihydrate plaster powder.

A second aspect of the invention is directed to the use of a retardant for the stabilization of β-Hemihydrate plaster, thereby providing stabilized β-hemihydrate plaster preferably as a powder.

The starting β-Hemihydrate plaster is preferably available also as a powder.

A third aspect of the invention is directed to a stabilized β-Hemihydrate free flowable plaster powder comprising and less than 3.5%, preferably less than 2.6%, more preferably less than 2.2%, most preferably less than 1.8% by weight of residual moisture pursuant to standard ASTM C471 M.

A fourth aspect of the invention is directed to a stabilized β-Hemihydrate plaster powder made according to the process of the invention.

According to some embodiments, the stabilized β-Hemihydrate plaster powder exhibits a slump of 200 mm using a water/plaster ratio which is below 0.7.

A fifth aspect of the invention is directed to the manufacture of a plasterboard which involves the use of a stabilized β-Hemihydrate according to the invention.

According to the process of the present invention, the treated β-hemihydrate becomes stabilized durably and does no longer need to be dried in order to be stored for an extended period of time. The process of the invention overcomes the drawbacks of the prior art by providing a stabilized β-hemihydrate plaster which remains stable in time, and thus by providing a process which is less stringent to perform, which is more flexible to operate and provides a more economical solution.

In addition to these advantageous effects, it was unexpectedly discovered that the resulting stabilized p-hemihydrate plaster exhibits a much lower water demand than in the prior art.

In addition, it has been surprisingly discovered that the water demand of the resulting stabilized product, once dried was dramatically decreased.

Indeed, the lower is the water demand the lower is the need to remove the excess water by a drying process. Thus, there is a real advantage in providing a hemihydrate product exhibiting a lower water demand and particularly a β-hemihydrate product exhibiting such property. The stabilized product according to the invention allows decreasing by 20% the water demand usually required in the prior art.

DRAWINGS

DETAILED DESCRIPTION OF THE INVENTION

Figure 1:
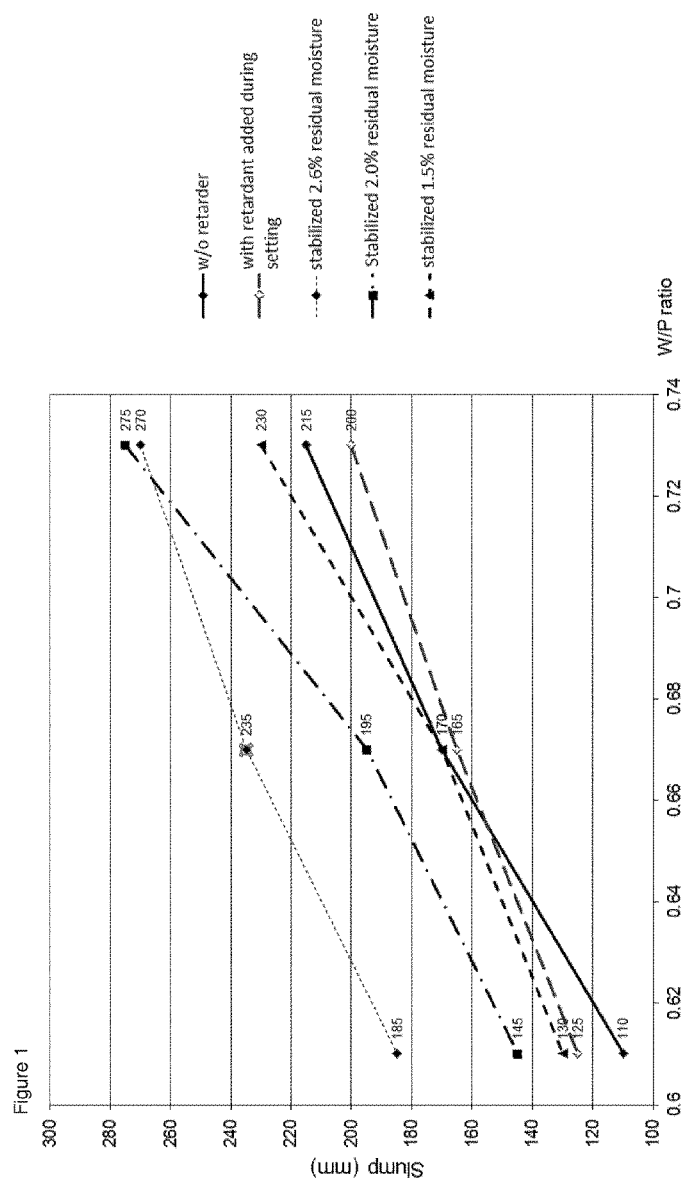
FIG. 1 is a graph showing the slump obtained using stabilized powder according to the invention in comparison to a powder stabilized according to the prior art techniques, i.e. without retardant.

As presented above, the instant invention aims at providing a new process for the stabilization of β-hemihydrate plasters.

Within the meaning of the present invention, the terms p-hemihydrate plaster, plaster of Paris, calcined gypsum, or stucco are used interchangeably. Eventhough several by-products such as anhydrite or dehydrated gypsum may be formed during the calcination process, the term β-hemihydrate plaster refers to a plaster which substantially comprises hemihydrate in the β-form. Examples of β-hemihydrate usually comprise less than 20% by weight of side products, for example less than 15%, preferably less than 10%, more preferably less than 5% and even more preferably less than 2% by weight based on the total weight of the calcined product.

The fed plaster does not need to be engaged at a high temperature as it is the case in some prior art processes or when steam is used. As a result, plaster may be treated at a temperature within the range of 20 to 70° C., usually at a temperature of about 50° C. which saves some additional energy in the process.

In the stabilization process of the invention the fed β-hemihydrate plaster is wetted (or moistened, both terms being used interchangeably), preferably homogeneously with an aqueous solution and a retardant. The stabilization process can be carried out batchwise or in a continuous way.

The amount of water involved into the stabilization process may vary depending on the composition of the β-hemihydrate plaster to be treated. It is preferred to provide a metering of the combined water and/or moistening water so as to involve about 1 to 6% based on the weight of the HH. The composition may indeed comprise higher proportions of insoluble species, e.g. anhydrites which need to be hydrated during ageing. The amount of water also influences the final water demand and the less water is used, the better results can be achieved.

In order to rely on an objective baseline, the amount of water involved into the process of the present invention can be based on the amount of residual water that it provides pursuant to the standard drying procedure at 45° C. following procedure ASTM C471M (paragraph 7). This reference allows taking into account the combined water which contributes to the hydration of the side product species during the ageing process of the internal structure of the plaster. Thus, within the scope of the invention it is preferred to provide a metering of the combined water and water amount so as to get up to 3.5%, preferably between 1 and 2.6%, most preferably between 1 and 2.2% and most preferably of about 1.8% of free residual moisture in the moistened blend.

Methods to wet the fed plaster are those which are conventionally available to the skilled man. It is recommended that the method to add the solution be such that all the particles of the plaster become wetted to provide a uniform stabilized product.

Whereas in some stabilization processes of the prior art, the water has to be injected as a steam, the solution may be added to the plaster at ambient temperature or reduced temperatures to thus saves additional energy for the process. Typically, the solution may be engaged into the stabilization process at a temperature within the range of 10 and 99° C., preferably 25 to 80° C., most preferably between 25 t o 60° C.

Within the meaning of the present invention, the term "retardant" refers to the chemical germination inhibitors. They are typically chelating agents which are able to interfere with the chemical activity of the calcium ions. They may be nucleation retardants, hydrolysed or degraded proteins such as keratin, for example Retardan P, Retardan L, Plastretard PE, Plastretard P200, Plastretard L200; phosphonic acids and salts thereof such as phosphonic nitrilotrimethylen, hydroxyethyliden 1-1 biphosphonic acid, polyphosphoric acid; phosphates and salts thereof such as sodium tripolyphosphate; carboxylic acids in basic pH such as tartaric acid, malic acid, tricarbellic acid; polyelectrolytes of the carboxylic or the polyphosphonic types such as polyacrylic acids having a molecular weight of less than 5000, and mixtures thereof.

This also includes other germination inhibitors that would be known and available as such to the skilled man.

Preferred examples of retardant within the scope of the invention are Retardan P or Retardan L from the company Sika, Plast retard PE and Plast retard L from the company Sicit®, Retardan 200P or Retardan 200L from the company Sika, or mixture thereof.

The amount of retardant involved in the stabilization process typically represents from 0.001 to 0.1%, generally from 0.005 to 0.1%, preferably from 0.01 and 0.03% and most preferably about 0.02% by weight based on the weight of the fed plaster.

It is preferably added to the solution before addition to the plaster to ensure a homogeneous distribution and contribution of the retardant into the plaster.

The term stabilization within the meaning of the present invention refers in the broadest manner to the quench of the thirst of the plaster. It should be noted that the curing conditions and time depend upon the nature of the plaster, the temperature and moisture. As an option, the curing step may occur for a minimum of 3 minutes depending on the nature and composition of the plaster or on the type and amount of retardant involved into the mixture. Typical curing times may be comprised within the conventional curing times, i.e. 4 to 15 minutes.

Figure 2:
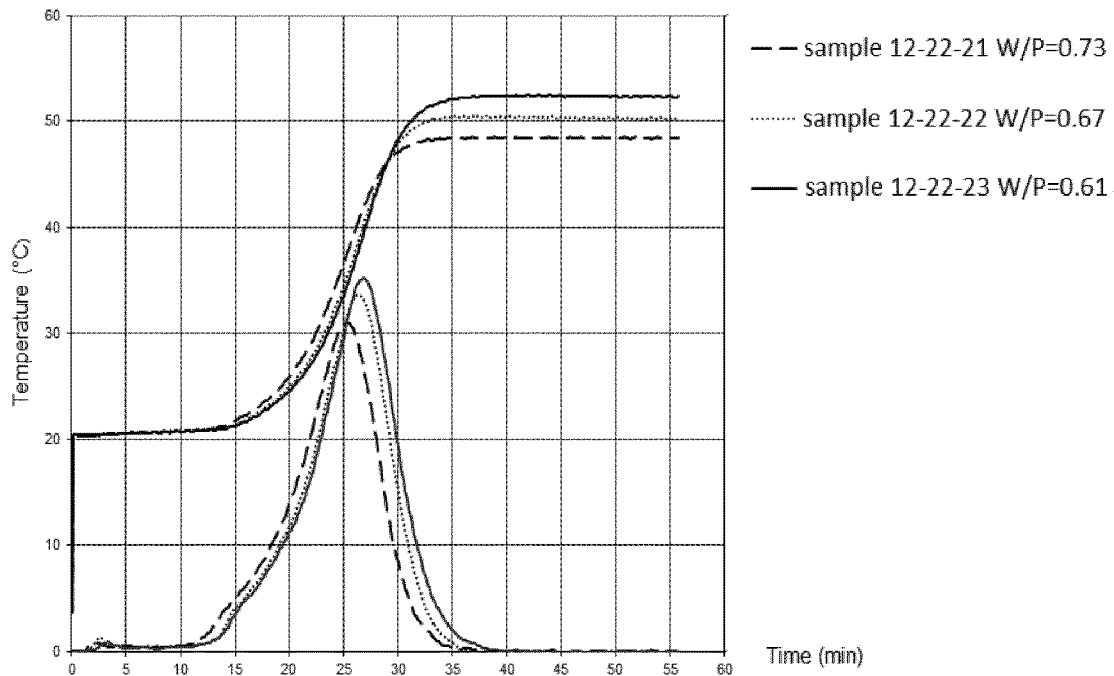
FIG. 2 is a graph of the temperature vs time for plasters that were stabilized according to the process of the invention in comparison to plasters wherein no retardant was used for stabilization. For each of the samples the graph also includes the derivative curve which is indicative of the rate of setting of the corresponding sample.
Figure 2:
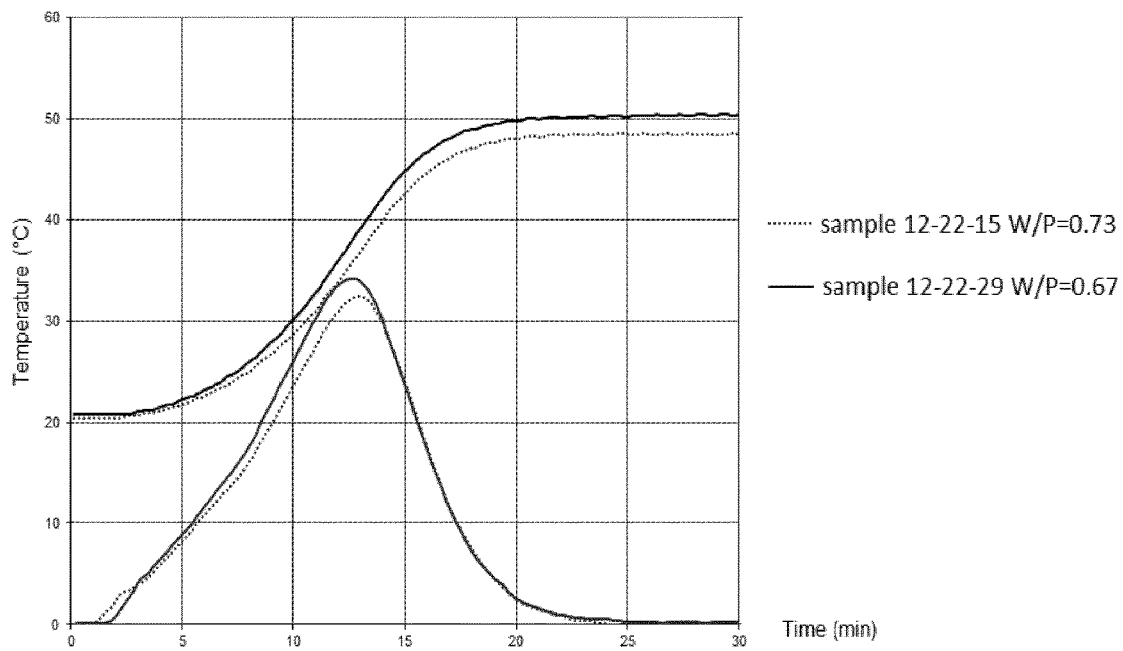

Following the addition of the solution, the residence conditions, which used to be a limiting factor in the prior stabilization processes are significantly improved in the instant invention as the plaster gets stabilized once it is in contact with the retardant and water. As a result, the stabilized plaster can easily be transported and stored before being dried without developing strength on setting and endanger the product. The product may thus be stored in its wetted form, for several weeks or months without alteration of the properties. The stabilized plaster thus has the ability of being processed on demand, thereby allowing a controlled production. Its performance and rate of setting remain the same and unaltered when the product is further processed as depicted in FIG. 2.

The stabilization process may further comprise a drying step. Temperature may be typically comprised between 75 and 130° C., below 115° C. or most preferably below 105° C.

It is another aspect of the present invention to provide a finalized plaster that has been dried and optionally grinded into a powder and is ready to be further processed into plaster elements, such as plaster boards.

Whereas water/plaster ratio in the prior art plaster gauged was limited, the stabilized plaster prepared according to the present invention now allows decreasing this ratio by up to 20%. Thus, based on standard techniques for measuring the slump, i.e. using conventional cylinder such as a Schmidt ring (60 mm width and 50 mm height), the invention now allows reaching a slump of at least 200 mm as required for the manufacture of plasterboard with a lower water/plaster ratio.

Typically, the water/weight ratio for a slump of 200 mm using a cylinder of 71 mm width and 43 mm height is less than 0.7, typically comprised between 0.6 and 0.7, for example between 0.65 and 0.69.

Another aspect of the present invention is directed to the use for the first time of a retardant for the stabilization of β-hemihydrate plasters.

The subject matter of the present invention will now be illustrated in the following examples.

EXAMPLES

Example 1: Preparation of Stabilized Plasters

To an amount of 500 g standard HH plaster (including 5.8% of combined water and a purity of 95% as measured by standard methods), a solution of a retardant (Sicit Plastretard PE) at different concentrations but contributing in all situation to 0.02% by weight based on weight of the plaster, was added to provide a moisture residual content of 1.5; 2.0 and 2.6%. The treated compositions were mixed with a wire whisk for 20 seconds and treated with an immersion blender until tactical knots are gone. The stabilized plasters thus prepared were then cured for 10 min; 30 min or 24 h and the product was dried into a final powder.

Example 2: Comparison of Slump

The plasters prepared in example 1 with a moisture of 1.5, 2.0 and 2.6% (standard ASTM 471 M for powder humidity) cured for 10 minutes were tested for slumps using a cylinder of 71×43 mm. The slump values were measured and compared. A cylinder of 71×43 mm has a slightly higher volume than the Schmidt ring but offers comparable results with conventional rings since the larger volume is compensated by the lower height.

FIG. 1 shows that all the plasters that were stabilized according to the invention exhibit a much higher slump which denotes a higher flowability in comparison to the products that are stabilized in the prior art. The results measured for the plasters prepared according to the prior art or further treated with retardant at the time of the preparation of slump cannot provide the same advantageous properties.

Example 3: Applicability to Different Plaster Types

Samples of different stabilized plasters types taken from 3 different plants of the applicant were prepared according to the procedure detailed in example 1 and slumps were prepared for each samples using the same cylinder as in example 2. For each sample stabilized according to the invention, the ratio water/slurry ratios required to provide a slump of about 150 mm (mechanical stirring) using a conventional cylinder was systematically at least 10% lower compared to the corresponding samples that were stabilized using the conventional process.

Therefore, the process and plasters of the invention show advantageous properties and uses in different plaster types.

The invention claimed is:

1. A process for the manufacture of stabilized β-hemihydrate plaster powder comprising the moistening of calcined β-Hemihydrate with the addition of a retardant.

2. The process according to claim 1, comprising the steps of
providing calcined β-hemihydrate plaster; and
moistening of said calcined β-Hemihydrate by the addition of water and a retardant to provide stabilized -hemihydrate plaster powder, the amount of moistening water is comprised between 1 and 6% by weight based on the weight of the fed-hemihydrate plaster.

3. The process according to claim 1, wherein the retardant is added together with the moistening water.

4. The process according to claim 1, wherein the amount of residual water in the stabilized β-hemihydrate plaster powder is less than 3.5%, by weight pursuant to standard ASTM C471 M.

5. The process according to claim 1, wherein the amount of residual water in the stabilized 13 -hemihydrate plaster powder is less than 2.6%, by weight pursuant to standard ASTM C471 M.

6. The process according to claim 1, wherein the amount of residual water in the stabilized β-hemihydrate plaster powder is less than 2.2%, by weight pursuant to standard ASTM C471 M.

7. The process according to claim 1, wherein the amount of residual water in the stabilized β-hemihydrate plaster powder is less than 1.8%, by weight pursuant to standard ASTM C471 M.

8. The process according to claim 1, wherein the amount of water is comprised between 1 and 6% by weight based on the weight of the fed β-hemihydrate plaster.

9. The process according to claim 1, wherein the amount of water is comprised between 3 and 5% by weight based on the weight of the fed β-hemihydrate plaster.

10. The process according to claim 1, wherein the amount of retardant is from 0.001 to 0.1% by weight based on the weight of the fed β-hemihydrate plaster.

11. The process according to claim 1, wherein the amount of retardant is from 0.005 to 0.1% by weight based on the weight of the fed β-hemihydrate plaster.

12. The process according to claim 1, wherein the amount of retardant is from 0.01 to 0.03% by weight based on the weight of the fed β-hemihydrate plaster.

13. The process according to claim 1, wherein the retardant is selected from the group consisting of nucleation retardants, hydrolysed or degraded proteins, hydrolysed amino acid, polycondensated amino acid, phosphonic acids and salts thereof, polyphosphoric acid, phosphates and salts thereof, carboxylic acids in basic pH, polyacrylic acids having a molecular weight of less than 5000, and mixtures thereof.

14. The process according to claim 1, wherein the retardant is a hydrolysed amino acid or a mixture thereof.

15. The process according to claim 14, wherein the hydrolysed amino acid is selected from the group consisting of polycondensated amino acid, Ca-salt, polycondensated amino acid Ca-salt as a liquid solution, degraded mixture of polyamides, salified with calcium, modified amino acid or mixture thereof.

16. The process according to claim 1, wherein the β-hemihydrate plaster fed into the process has a temperature comprised between 10° C. and 99° C.

17. The process according to claim 1, wherein the β-hemihydrate plaster fed into the process has a temperature comprised between 25° C. and 80° C.

18. The process according to claim 1, wherein the β-hemihydrate plaster fed into the process has a temperature comprised between 25° C. and 60° C.

19. The process according to claim 1, carried out at atmospheric pressure.

20. The process according to claim 1 wherein the stabilized β-hemihydrate plaster is further subjected to a drying and/or grinding step and optionally stored for at least several days before being subjected to a drying and/or grinding step.

21. The process according to claim 20, wherein the drying step is performed at a temperature within the range of 75 and 130° C.

22. The process according to claim 20, wherein the drying step is performed at a temperature within the range of 75 to 115° C.

23. The process according to claim 20, wherein the drying step is performed at a temperature within the range of 75 to 105° C.

* * * * *